US011948731B2

(12) United States Patent
Kitamoto (10) Patent No.: US 11,948,731 B2
(45) Date of Patent: Apr. 2, 2024

(54) CONTROL DEVICE FOR POWER CONVERSION DEVICE

(71) Applicant: HONDA MOTOR CO., LTD., Tokyo (JP)

(72) Inventor: Ryota Kitamoto, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 153 days.

(21) Appl. No.: 17/680,990

(22) Filed: Feb. 25, 2022

(65) Prior Publication Data

US 2022/0310318 A1    Sep. 29, 2022

(30) Foreign Application Priority Data

Mar. 25, 2021  (JP) .................................. 2021-052255

(51) Int. Cl.
*H02M 1/14*     (2006.01)
*H01F 37/00*    (2006.01)
*H02M 1/00*     (2006.01)
*H02M 3/158*    (2006.01)

(52) U.S. Cl.
CPC .......... *H01F 37/00* (2013.01); *H02M 1/0064* (2021.05); *H02M 3/158* (2013.01)

(58) Field of Classification Search
CPC ..... H02F 37/00; H02M 1/0064; H02M 3/158; H02M 1/14; H02M 1/15; H02M 3/156
See application file for complete search history.

(56) References Cited

U.S. PATENT DOCUMENTS

| 11,757,348 | B2 * | 9/2023 | Sato .................... H02M 1/0064 363/13 |
| 2017/0244338 | A1 | 8/2017 | Kitamoto | |
| 2019/0366850 | A1 | 12/2019 | Ge et al. | |
| 2023/0141010 | A1 * | 5/2023 | Murashita ............ H02M 7/003 336/212 |

FOREIGN PATENT DOCUMENTS

| JP | 2017-153237 A | 8/2017 |
| JP | 2017-153240 A | 8/2017 |
| JP | 2019-024283 A | 2/2019 |

OTHER PUBLICATIONS

Nov. 22, 2022, Japanese Office Action issued for related JP Application No. 2021-052255.

* cited by examiner

*Primary Examiner* — Adolf D Berhane
(74) *Attorney, Agent, or Firm* — Paratus Law Group, PLLC (57) ABSTRACT

A control device for a power conversion device using a multi-phase magnetic coupling reactor is provided. The multi-phase magnetic coupling reactor including: a first outer coil; a second outer coil; an inner coil; and a core. Directions of magnetic fluxes generated in the first outer coil, the second outer coil, and the inner coil are opposite to each other in any combination. The control device is configured to switch among a one-phase operation, a two-phase operation, and a three-phase operation. The control device is configured to select two phases of the first outer coil and the second outer coil in the two-phase operation, and the control device is configured to select one of the first outer coil and the second outer coil in the one-phase operation before the two-phase operation or a one-phase operation after the two-phase operation.

3 Claims, 7 Drawing Sheets

| PATTERN 1 | PHASE 1 | PHASE 2 | PHASE 3 |
|---|---|---|---|
| ONE-PHASE OPERATION | ○ | | |
| TWO-PHASE OPERATION | ○ | | ○ |
| THREE-PHASE OPERATION | ○ | ○ | ○ |

| PATTERN 2 | PHASE 1 | PHASE 2 | PHASE 3 |
|---|---|---|---|
| ONE-PHASE OPERATION | | ○ | |
| TWO-PHASE OPERATION | ○ | | ○ |
| THREE-PHASE OPERATION | ○ | ○ | ○ |

| PATTERN 3 | PHASE 1 | PHASE 2 | PHASE 3 |
|---|---|---|---|
| ONE-PHASE OPERATION | | | ○ |
| TWO-PHASE OPERATION | ○ | | ○ |
| THREE-PHASE OPERATION | ○ | ○ | ○ |

CONTROL DEVICE FOR POWER CONVERSION DEVICE

CROSS-REFERENCE TO RELATED APPLICATIONS

The present application claims the benefit of priority of Japanese Patent Application No. 2021-052255, filed on Mar. 25, 2021, the content of which is incorporated herein by reference.

TECHNICAL FIELD

The present invention relates to a control device for a power conversion device.

BACKGROUND ART

In a DC-DC converter of a vehicle such as an electric vehicle or a hybrid electrical vehicle (HEV), a reactor configured by mounting a coil around a core is used. In recent years, a proposal is made to use a multi-phase magnetic coupling reactor as the reactor to adjust a ripple of an output current of the DC-DC converter. It is known that in such a multi-phase converter, loss changes depending on the number of phases to be operated.

For example, JP-A-2017-153240 proposes that a loss map with a current as a center is created and an operation is performed with a most efficient number of phases.

A DC-DC converter disclosed in JP-A-2017-153240 uses a four-phase reactor using two magnetic coupling reactors in which a core with two phases is integrated, and is not a magnetic coupling reactor in which a core with three or more phases is integrated. In the magnetic coupling reactor in which the core with two phases is integrated, when the number of phases to be operated is reduced or increased, a phase to be operated in units of cores is uniquely determined. On the other hand, in a DC-DC converter using the magnetic coupling reactor in which the core with three or more phases is integrated, when the number of phases to be operated is reduced or increased, the phase to be operated is not uniquely determined.

In the DC-DC converter using the magnetic coupling reactor in which the core with three or more phases is integrated, when the phase to be operated is not appropriately selected at the time of switching from a one-phase operation to a two-phase operation and switching from the two-phase operation to the one-phase operation, a fluctuation in a current may occur.

SUMMARY

The present invention provides a control device for a power conversion device capable of preventing a fluctuation in a current at the time of switching from a one-phase operation to a two-phase operation and at the time of switching from the two-phase operation to the one-phase operation.

According to an aspect of the present invention, there is provided a control device for a power conversion device using a multi-phase magnetic coupling reactor, the multi-phase magnetic coupling reactor including: a first outer coil; a second outer coil; an inner coil disposed between the first outer coil and the second outer coil; and a core including a first outer core portion around which the first outer coil is wound, a second outer core portion around which the second outer coil is wound, and an inner core portion around which the inner coil is wound, where: the first outer core portion, the second outer core portion, and the inner core portion extends in a first direction and are disposed side by side in a second direction orthogonal to the first direction; the first outer core portion, the second outer core portion, and the inner core portion are connected by a first connecting portion that extends in a second direction on one end side in the first direction; the first outer core portion, the second outer core portion, and the inner core portion are connected by a second connecting portion that extends in the second direction on the other end side in the first direction; and directions of magnetic fluxes generated in the first outer coil, the second outer coil, and the inner coil are opposite to each other in any combination; the control device is configured to switch among: a one-phase operation of causing currents to flow through any one of the first outer coil, the second outer coil, and the inner coil to be operated; a two-phase operation of causing the currents to flow through any two of the first outer coil, the second outer coil, and the inner coil to be operated: and a three-phase operation of causing the currents to flow through all of the first outer coil, the second outer coil, and the inner coil to be operated; the control device is configured to select two phases of the first outer coil and the second outer coil in the two-phase operation; and the control device is configured to select one of the first outer coil and the second outer coil in the one-phase operation before the two-phase operation or a one-phase operation after the two-phase operation.

According to the present invention, at the time of switching from the one-phase operation to the two-phase operation and switching from the two-phase operation to the one-phase operation, an operating phase operates as it is, and a phase in which an operation state is changed is minimum, and thus a fluctuation of a current is reduced.

DESCRIPTION OF EMBODIMENTS

Hereinafter, a control device for a power conversion device according to an embodiment of the present invention will be described with reference to drawings.

Figure 1:
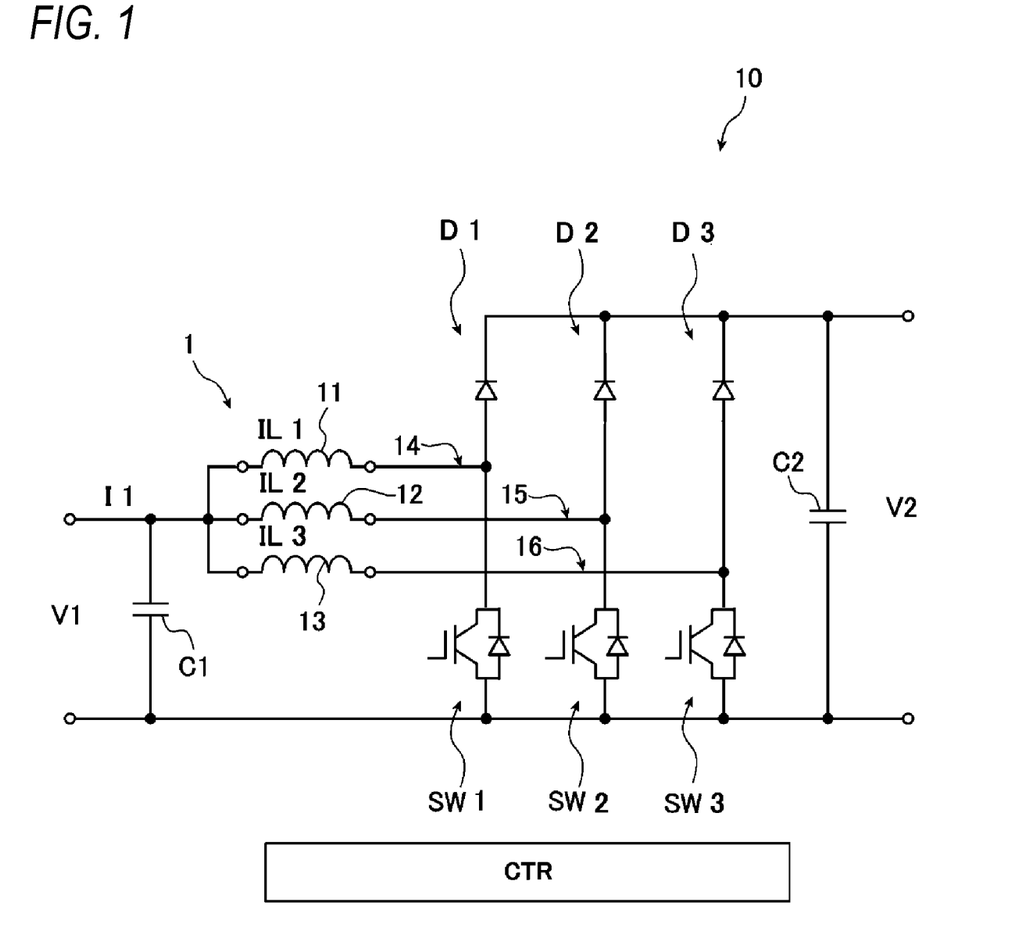
FIG. 1 is a circuit diagram of a three-phase interleaved DC-DC converter 10.

First, a three-phase interleaved DC-DC converter as an example of a power conversion device to be controlled by the control device of the present invention will be described. FIG. 1 is a circuit diagram showing the three-phase interleaved DC-DC converter.

A three-phase interleaved DC-DC converter 10 (hereinafter referred to as "DC-DC converter 10") shown in FIG. 1 includes a smoothing capacitor C1, a three-phase magnetic coupling reactor 1 (hereinafter referred to as "three-phase reactor") having three coils 11 to 13, switch portions SW1, SW2, SW3, diodes D1, D2, and D3, a smoothing capacitor C2, and a control device CTR.

When the DC-DC converter 10 operates using a voltage V1 on a smoothing capacitor C1 side as an input voltage and a voltage V2 on a smoothing capacitor C2 side as an output voltage, the DC-DC converter boosts the input voltage V1.

In the three-phase reactor 1, input terminals of the coils 11 to 13 are connected in parallel to a power supply line on a high potential side. An output terminal of the coil 11 of the three-phase reactor 1 is connected to an intermediate node between the switch portion SW1 and the diode D1 connected in series, and forms a first voltage conversion unit 14. An output terminal of the coil 12 of the three-phase reactor 1 is connected to an intermediate node between the switch portion SW2 and the diode D2 connected in series, and forms a second voltage conversion unit 15. An output terminal of the coil 13 of the three-phase reactor 1 is connected to an intermediate node between the switch portion SW3 and the diode D3 connected in series, and forms a third voltage conversion unit 16. Each of the switch portions SW1, SW2, and SW3 has a switching element such as an insulated-gate bipolar transistor (IGBT) and a reflux diode connected in parallel to the switching element.

A term "three-phase" of the three-phase reactor 1 means that the number of conversion units is three. A one-phase operation to be described later means that the number of conversion units that operate among the first voltage conversion unit 14 to the third voltage conversion unit 16 is one, a two-phase operation means that the number of conversion units that operate among the first voltage conversion unit 14 to the third voltage conversion unit 16 is two, and a three-phase operation means that the number of conversion units that operate among the first voltage conversion unit 14 to the third voltage conversion unit 16 is three. In a following description, the first voltage conversion unit 14 may be referred to as a "phase 1", the second voltage conversion unit 15 may be referred to as a "phase 2", and the third voltage conversion unit 16 may be referred to as a "phase 3".

Figure 6:
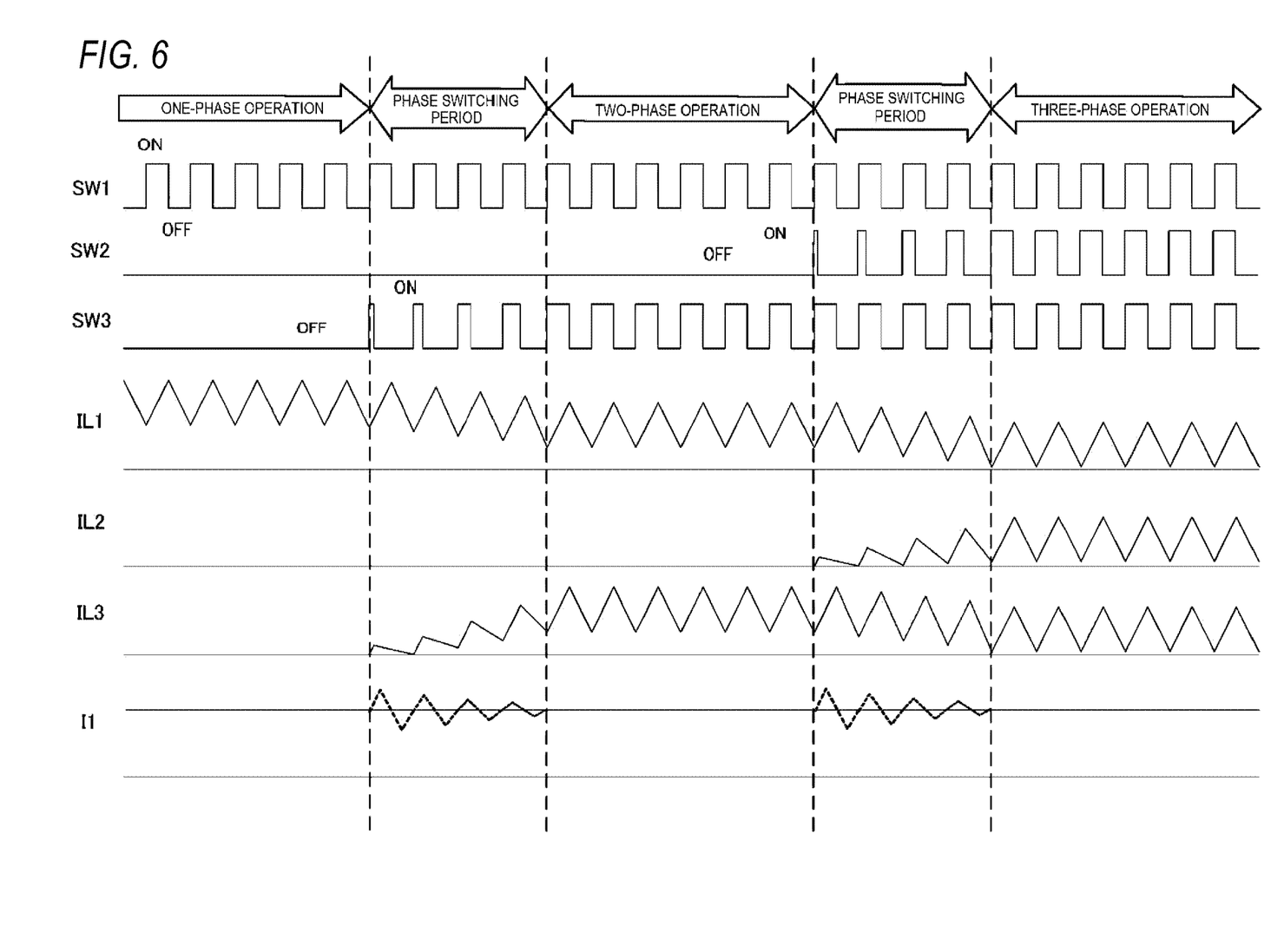
FIG. 6 is a timing chart of a pattern 1 in FIG. 3.

The switching elements of the switch portions SW1 to SW3 are controlled to be turned on and off by signals from the control device CTR (see FIG. 6). The three voltage conversion units 14, 15, and 16 included in the DC-DC converter 10 are electrically connected in parallel, and the switching element of at least one of the voltage conversion units 14, 15, and 16 is subjected to an ON/OFF switching operation at a desired timing, so that the voltage V1 is boosted with a direct current as it is, and the voltage V2 is output. The ON/OFF switching operation of the switch portions SW1, SW2, and SW3 of the voltage conversion units 14, 15, and 16 is controlled by a switching signal having a predetermined duty ratio in a pulse form from a switching control unit to the DC-DC converter 10.

When the switching elements of the voltage conversion units 14, 15, and 16 are subjected to ON/OFF switching control, an input current to the DC-DC converter 10 flows to a switching element side during an ON operation, the three-phase reactor 1 stores energy, and the input current to the DC-DC converter 10 flows to a diode side during an OFF operation, and the three-phase reactor 1 releases the stored energy. In a case of the one-phase operation in which only one of the three voltage conversion units 14, 15, and 16 of the DC-DC converter 10 is driven, a current flowing through the one voltage conversion unit of the DC-DC converter 10 during the OFF operation is output. In addition, when the two-phase operation in which two of the three voltage conversion units 14, 15, and 16 of the DC-DC converter 10 are driven, interleave control is performed to shift ON/OFF switching phases of the voltage conversion units 14, 15, and 16 to be driven by 180°. When the three-phase operation in which all of the three voltage conversion units 14, 15, and 16 of the DC-DC converter 10 are driven, the interleave control is performed to shift the ON/OFF switching phases of each of the voltage conversion units 14, 15, and 16 by 120°.

Next, a structure of the three-phase reactor 1 will be described. In a following description, among the three coils 11 to 13, the coils 11 and 13 disposed on an outer side are referred to as a first outer coil 11 and a second outer coil 13, respectively, and the coil 12 sandwiched between the first outer coil 11 and the second outer coil 13 is referred to as an inner coil 12. In addition, as shown in FIGS. 2 and 3, a positional relationship of each part will be described using an orthogonal coordinate system of an X axis, a Y axis, and a Z axis of the three-phase reactor 1.

Figure 2:
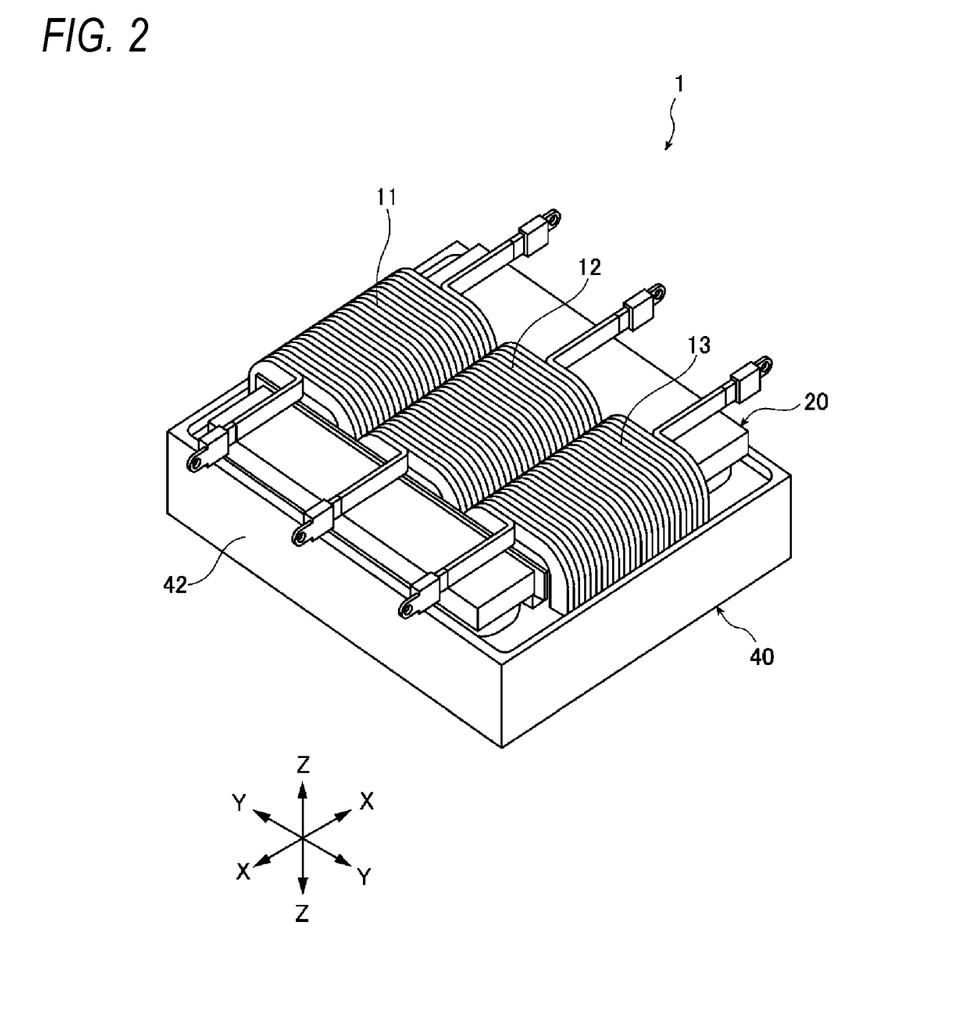
FIG. 2 is a perspective view of a three-phase magnetic coupling reactor 1 used in the DC-DC converter 10.
Figure 3:
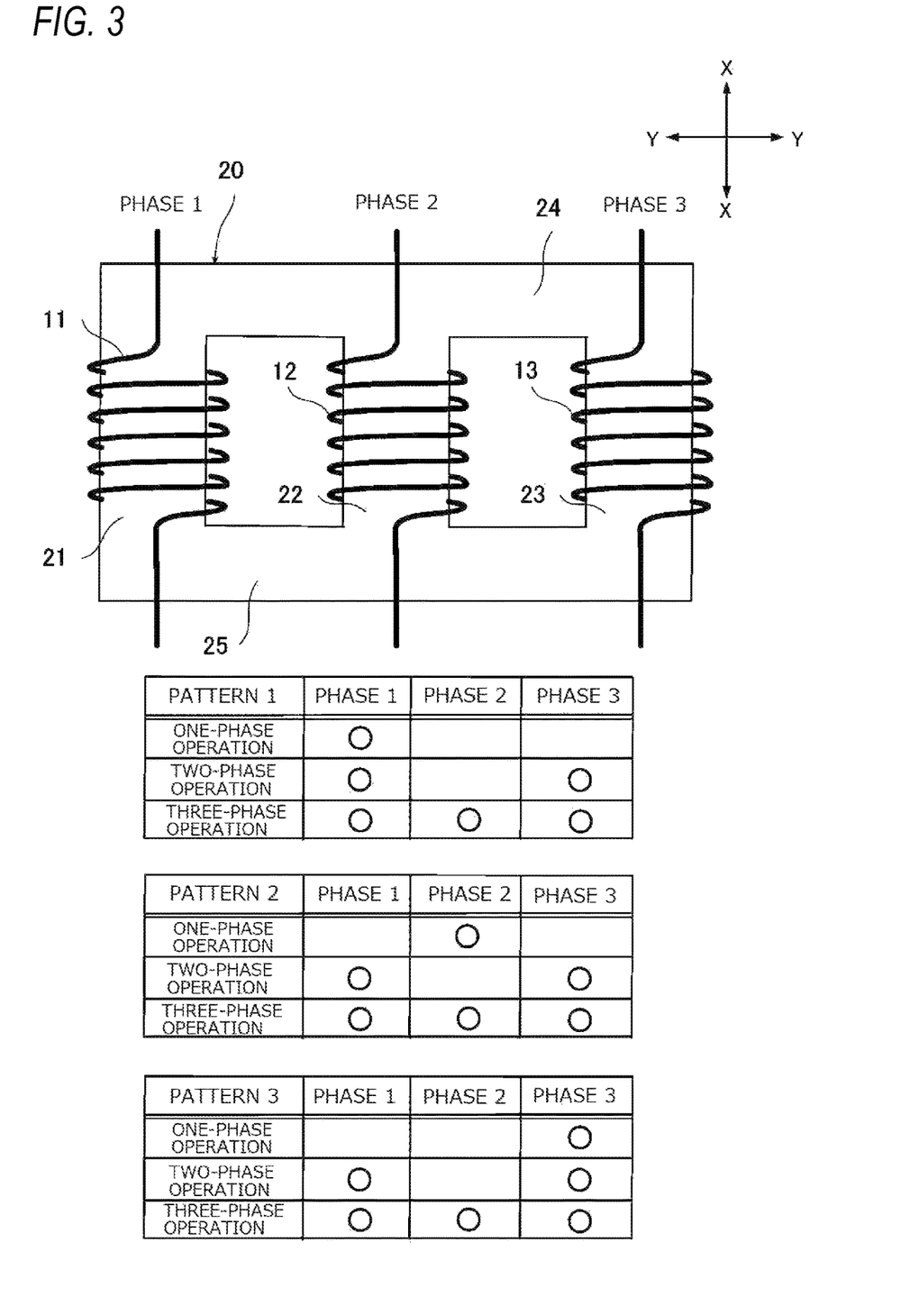
FIG. 3 is a plan view and a drive pattern of the three-phase magnetic coupling reactor 1.

As shown in FIG. 2, the three-phase reactor 1 includes the first outer coil 11, the second outer coil 13, the inner coil 12, a core 20, and a housing 40 that accommodates the first outer coil 11, the second outer coil 13, the inner coil 12, and the core 20.

The core 20 is formed by, for example, stacking thin plate-shaped electromagnetic steel sheets. As shown in FIG. 3, the core 20 includes a first outer core portion 21, an inner core portion 22, and a second outer core portion 23 that extend in an X-axis direction and disposed side by side in parallel with each other along a Y-axis direction, a first connecting portion 24 that extends in the Y-axis direction on one end side in the X-axis direction and connects the first outer core portion 21, the inner core portion 22, and the second outer core portion 23, and a second connecting portion 25 that extends in the Y-axis direction on the other end side in the X-axis direction and connects the first outer core portion 21, the inner core portion 22, and the second outer core portion 23. In other words, the core 20 is a core having a planar structure disposed on an XY plane formed along the X-axis direction and the Y-axis direction. The X-axis direction is a first direction of the present invention, and the Y-axis direction is a second direction of the present invention.

The first outer coil 11 is wound around the first outer core portion 21, the second outer coil 13 is wound around the second outer core portion 23, and the inner coil 12 is wound around the inner core portion 22. Therefore, the first outer core portion 21, the inner coil 12, and the second outer coil 13 extend in the X-axis direction and are disposed side by side in the Y-axis direction. The number of winds and a winding direction of each of the coils 11 to 13 are configured to be equal to each other.

In the three-phase reactor 1, when currents flow through any two or more of the coils 11, 12, and 13, directions of magnetic fluxes (hereinafter referred to as "magnetic flux directions") generated in each coil are opposite to each other in any combination, so that a magnetic flux generated in the core can be reduced. Accordingly, magnetic saturation in the core 20 can be prevented.

In the DC-DC converter 10 configured as described above, by increasing the number of the voltage conversion units 14, 15, and 16 to be driven, a ripple of an output current can be reduced. In addition, although switching loss increases due to an increase in the number of the voltage conversion units 14, 15, and 16 to be driven, conduction loss decreases. The control device CTR selects the number of voltage conversion units 14, 15, and 16 to be driven using a map or the like indicating energy efficiency of the DC-DC converter 10 in consideration of loss for each number of the voltage conversion units 14, 15, and 16 to be driven. In addition, the control device CTR selects a phase to be driven in the two-phase operation and the three-phase operation. The control device CTR of the present invention drives the DC-DC converter 10 in a pattern 1 or a pattern 3 shown in FIG. 3, which will be described in detail later.

(Three-Phase Operation)

In a case of the three-phase operation in which all phases of the phases 1 to 3 are operated, all the voltage conversion units 14, 15, and 16 (phase 1 to phase 3) operate, and thus there is no room for phase selection. On the other hand, in a case of the two-phase operation, any two of the voltage conversion units 14, 15, and 16 (phase 1 to phase 3) operate, and in a case of the one-phase operation, only one of the voltage conversion units 14, 15, and 16 (phase 1 to phase 3) operates, so that there is room for selection of the phase to be operated in the two-phase operation and the one-phase operation.

(Two-Phase Operation)

Therefore, first, the two-phase operation will be described.

Figure 4:
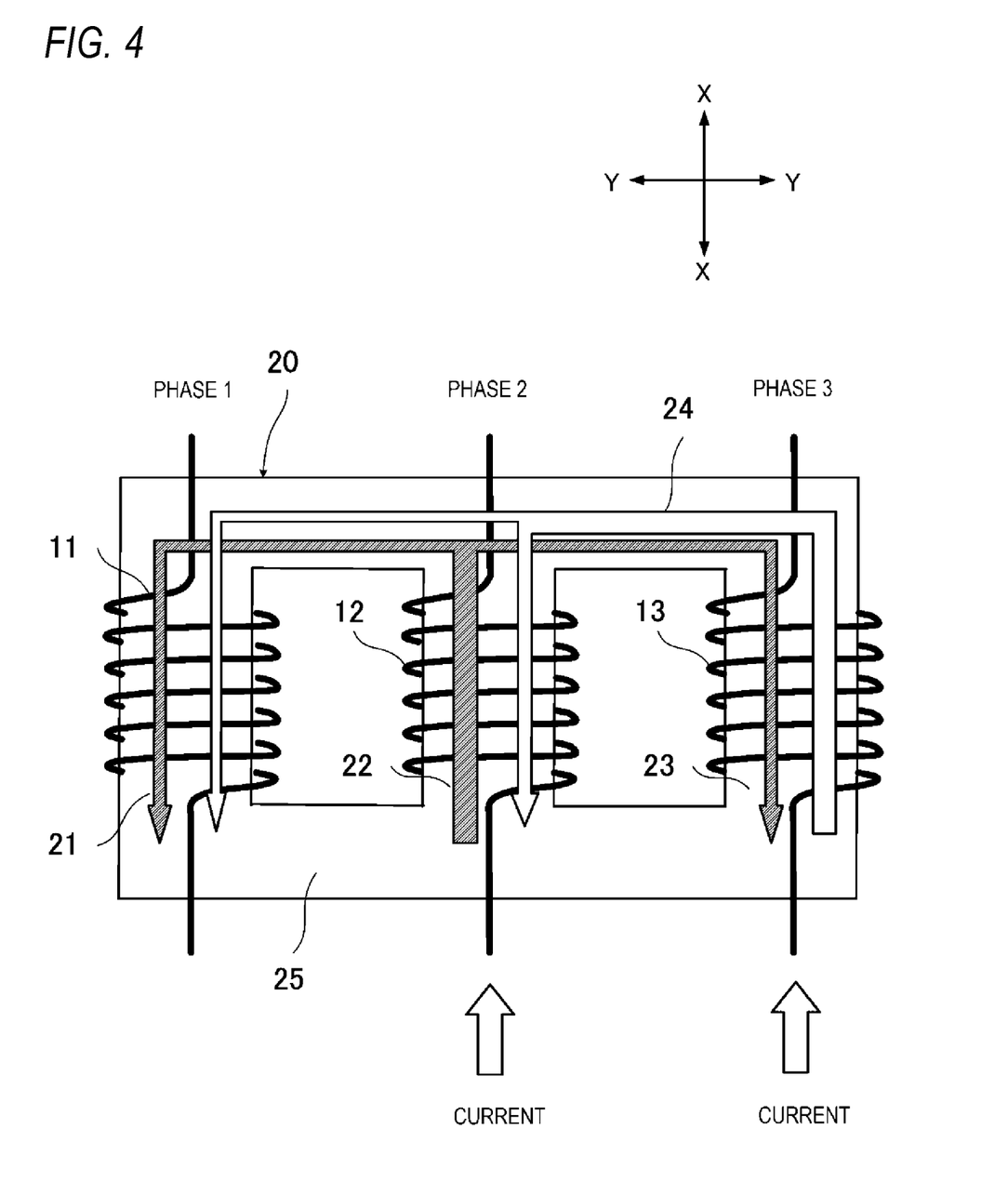
FIG. 4 is a diagram showing a magnetic flux amount of each core portion in a two-phase operation of a phase 2 and a phase 3.
Figure 5:
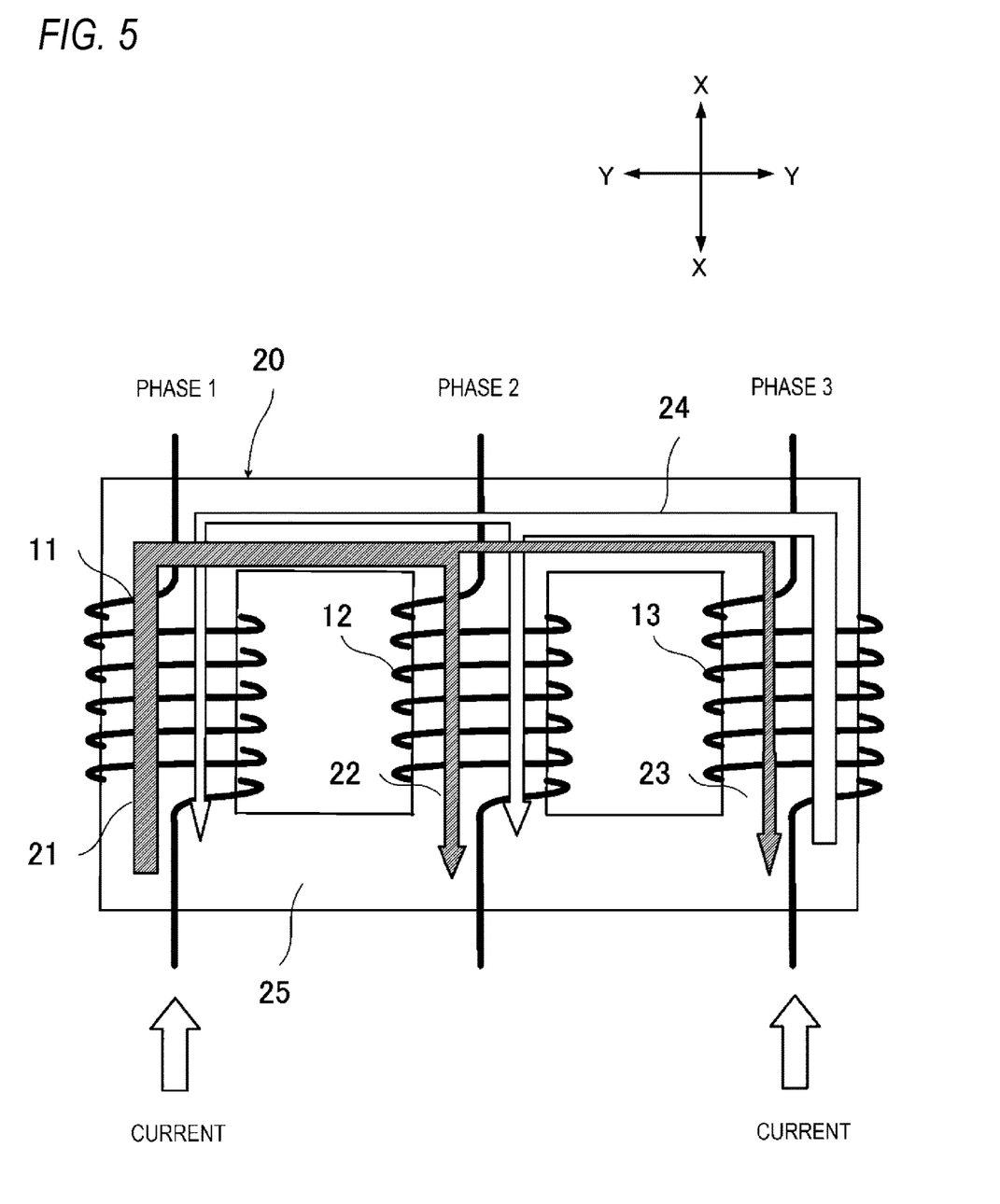
FIG. 5 is a diagram showing the magnetic flux amount of each core portion in a two-phase operation of a phase 1 and the phase 3.

FIG. 4 is a diagram showing a magnetic flux amount of each core portion in the two-phase operation of the phase 2 and the phase 3. FIG. 5 is a diagram showing the magnetic flux amount of each core portion in a two-phase operation of the phase 1 and the phase 3.

As shown in FIG. 4, when the phase 2 and the phase 3 are selected in the two-phase operation, the magnetic flux generated in the core 20 by the current flowing through the inner coil 12 (phase 2) is generated in a positive direction (upward in the drawing) in the inner core portion 22, and is generated in a reverse direction (downward in the drawing) in the first outer core portion 21 and the second outer core portion 23. The magnetic flux amount in the inner core portion 22 is the largest, and the magnetic flux amounts in the first outer core portion 21 and the second outer core portion 23 positioned equidistant from the inner core portion 22 are substantially equal and smaller than that in the inner core portion 22.

On the other hand, the magnetic flux generated in the core 20 by the current flowing through the second outer coil 13 (phase 3) is generated in the positive direction (upward in the drawing) in the second outer core portion 23, and is generated in the reverse direction (downward in the drawing) in the inner core portion 22 and the first outer core portion 21. The magnetic flux amount in the second outer core portion 23 is the largest, and the magnetic flux amounts in the inner core portion 22 close to the second outer core portion 23 is smaller than that in the second outer core portion 23, and the magnetic flux amount in the first outer core portion 21 farther from the second outer core portion 23 is the smallest.

As can be seen from an arrow in FIG. 4 schematically showing the magnetic flux direction and the magnetic flux amount, when the currents flowing through the inner coil 12 (phase 2) and the second outer coil 13 (phase 3) are the same, the magnetic flux amounts passing through the inner core portion 22 (phase 2) and the second outer core portion 23 (phase 3) are not uniform. The similar also applies to a case where the phase 1 and the phase 2 are selected in the two-phase operation.

On the other hand, as shown in FIG. 5, when the phase 1 and the phase 3 are selected in the two-phase operation, the magnetic flux generated in the core 20 by the current flowing through the first outer core portion 21 (phase 1) is generated in the positive direction (upward in the drawing) in the first outer core portion 21, and is generated in the reverse direction (downward in the drawing) in the inner core portion 22 and the second outer core portion 23. The magnetic flux amount in the first outer core portion 21 is the largest, and the magnetic flux amounts in the inner core portion 22 close to the first outer core portion 21 is smaller than that in the first outer core portion 21, and the magnetic flux amount in the second outer core portion 23 farther from the first outer core portion 21 is the smallest.

On the other hand, the magnetic flux generated in the core 20 by the current flowing through the second outer coil 13 (phase 3) is generated in the positive direction (upward in the drawing) in the second outer core portion 23, and is generated in the reverse direction (downward in the drawing) in the inner core portion 22 and the first outer core portion 21. The magnetic flux amount in the second outer core portion 23 is the largest, and the magnetic flux amounts in the inner core portion 22 close to the second outer core portion 23 is smaller than that in the second outer core portion 23, and the magnetic flux amount in the first outer core portion 21 farther from the second outer core portion 23 is the smallest.

As can be seen from an arrow in FIG. 5 schematically showing the magnetic flux direction and the magnetic flux amount, when the currents flowing through the first outer core portion 21 (phase 1) and the second outer coil 13 (phase 3) are the same, the magnetic flux amounts passing through the first outer core portion 21 (phase 1) and the second outer core portion 23 (phase 3) are uniform.

By selecting the phase 1 and the phase 3 in the two-phase operation thus, the magnetic flux amount passing through the first outer core portion 21 (phase 1) and the second outer coil 13 (phase 3) becomes uniform, so that magnetic characteristics are substantially equal in two phases, and control stability is good. Therefore, the phase 1 and the phase 3 are selected in the two-phase operation. Therefore, the control device CTR selects the phase 1 and the phase 3 as phases operating in the two-phase operation as shown in patterns 1 to 3 shown in FIG. 3.

(One-Phase Operation)

Figure 7:
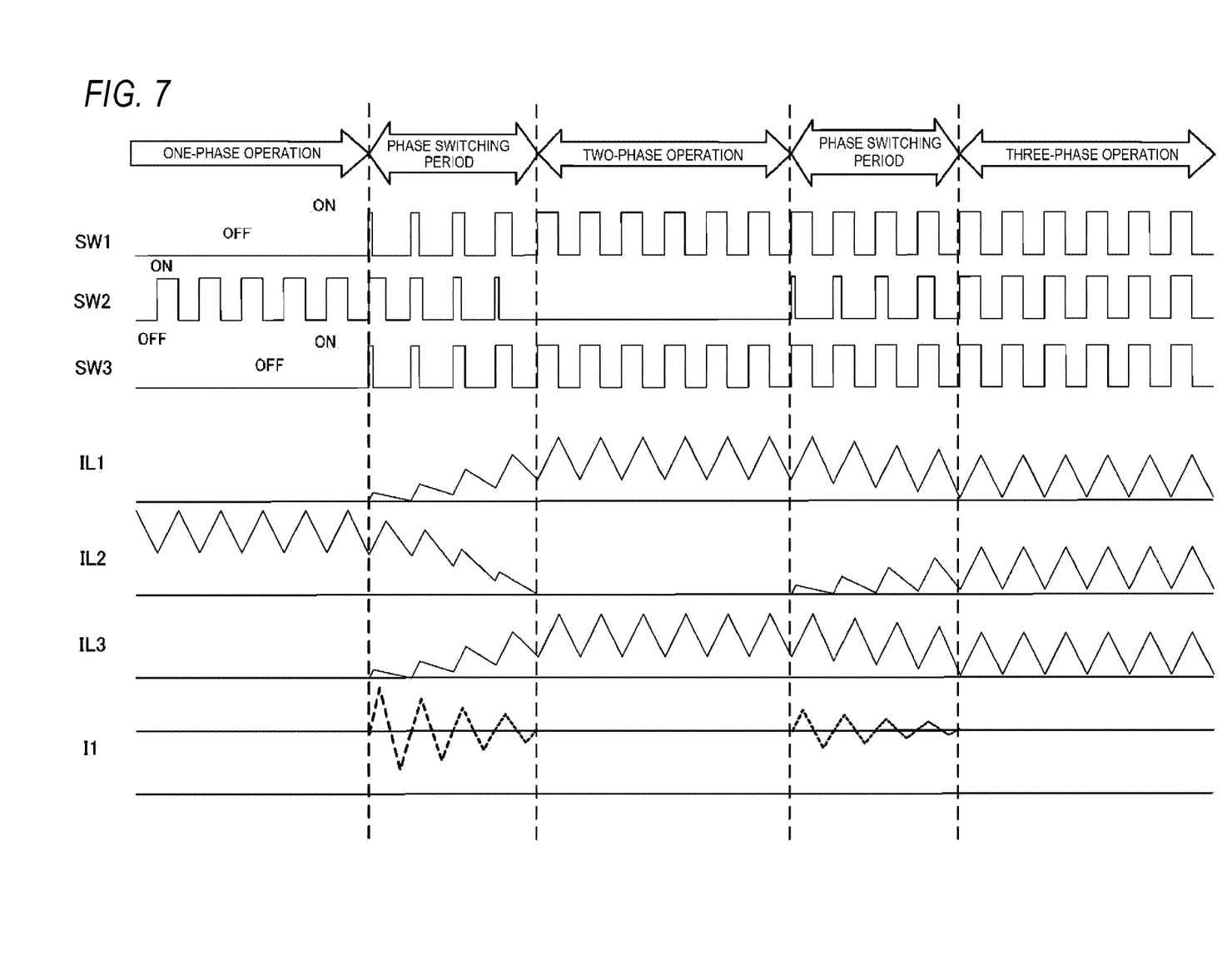
FIG. 7 is a timing chart of a pattern 2 in FIG. 3.

Next, the one-phase operation will be described with reference to FIGS. 6 and 7. FIG. 6 is a timing chart of the pattern 1 in FIG. 3. FIG. 7 is a timing chart of the pattern 2 in FIG. 3. In FIGS. 6 and 7, IL1 is a current flowing through the first outer coil 11. IL2 is a current flowing through the inner coil 12, IL3 is a current flowing through the second outer coil 13, and I1 is an input current to the three-phase reactor 1 (see FIG. 1).

In the one-phase operation, the phase 2 is generally selected. As described above, since the phase 1 and the phase 3 are selected by the two-phase operation, it is conceivable to use the phase 2 in the one-phase operation in order to equalize frequency of use and equalize loads of the coils and the like (pattern 2 in FIG. 3). In this case, as shown in FIG. 7, at the time of switching from the one-phase operation to the two-phase operation, the control device CTR stops ON/OFF control of the switch portion SW2 and starts ON/OFF control of the switch portion SW1 and the switch portion SW3. That is, the control device CTR completely stops the switch portion SW2 that is subjected to the ON/OFF switching operation, and starts the ON/OFF control of the switch portion SW1 and the switch portion SW3 that have been stopped so far. At this time, fluctuation of the input current I1 becomes large.

The similar also applies to switching from the two-phase operation to the one-phase operation. That is, at the time of switching from the two-phase operation to the one-phase operation, the control device CTR completely stops the switch portion SW1 and the switch portion SW3 that are subjected to the ON/OFF control, and starts the ON/OFF control of the switch portion SW2 that has been stopped so far. Also in this case, the fluctuation of the input current I1 becomes large.

On the other hand, in the present invention, the phase 1 or the phase 3 is selected by one phase operation. The similar applies to the pattern 1 of FIG. 3 in which the phase 1 is selected by the one-phase operation and the pattern 3 of FIG. 3 in which the phase 3 is selected by the one-phase operation. Therefore, only a case of the pattern 1 (a case of selecting the phase 1) is described here, and a description of a case of the pattern 3 (a case of selecting the phase 3) is omitted.

When the phase 1 is selected in the one-phase operation shown in the pattern 1 of FIG. 3, as shown in FIG. 6, the control device CTR may only turn on the switch portion SW3 at the time of switching from the one-phase operation to the two-phase operation. That is, the control device CTR starts the ON/OFF control of the switch portion SW3 that has been stopped so far while maintaining the ON/OFF control of the switch portion SW1 that is subjected to the ON/OFF control. In addition, the control device CTR maintains a stopped state as it is for the switch portion SW2 that has been stopped so far.

As is clear from comparison between FIGS. 6 and 7, when the pattern 1 (or pattern 3) of FIG. 3 is selected, the fluctuation of the input current I1 is smaller than that when the pattern 2 of FIG. 3 is selected. This is because, at the time of switching from the one-phase operation to the two-phase operation, the operating phase operates as it is, and the phase in which the operation state is changed is minimum. According to the pattern 1 (pattern 3), since the fluctuation of the input current I1 is reduced, controllability is stabilized. Accordingly, an area that can be operated with a small number of phases is increased, and efficiency of the DC-DC converter 10 is improved.

The similar also applies to switching from the two-phase operation to the one-phase operation. That is, at the time of switching from the two-phase operation to the one-phase operation, the control device CTR may completely stops only the switch portion SW3 among the switch portion SW1 and the switch portion SW3 that are subjected to the ON/OFF control. Also in this case, the fluctuation of the input current I1 can be reduced.

In addition, as shown in FIG. 6, it is preferable that, at the time of switching from the one-phase operation to the two-phase operation (phase switching period), the control device CTR maintains a duty ratio of the switch portion SW1 and gradually increases a duty ratio of the switch portion SW3. Specifically, the control device CTR gradually increases an ON time of the switch portion SW3 while maintaining an ON/OFF switching cycle. Accordingly, the fluctuation of the current at the time of switching from the one-phase operation to the two-phase operation is further reduced, and the switching can be smoothly performed.

In contrast, it is preferable that, at the time of switching from the two-phase operation to the one-phase operation (phase switching period), the control device CTR maintains the duty ratio of the switch portion SW1 and gradually reduces the duty ratio of the switch portion SW3. Specifically, the control device CTR gradually reduces the ON time of the switch portion SW3 while maintaining the ON/OFF switching cycle. Accordingly, the fluctuation of the current at the time of switching from the two-phase operation to the one-phase operation is further reduced, and the switching can be smoothly performed.

Adjustment of the duty ratio at the time of switching is the similar for a time of switching from the two-phase operation to the three-phase operation (phase switching period) and a time of switching from the three-phase operation to the two-phase operation (phase switching period). The duty ratio of the switch portion connected to the phase to be driven from being stopped in the operation state may be gradually increased, and the duty ratio of the switch portion connected to the phase to be stopped from being driven in the operation state may be gradually reduced.

Although the embodiment is described above with reference to the drawings, it is needless to say that the present invention is not limited to such examples. It is apparent to those skilled in the art that various changes and modifications can be conceived within the scope of the claims, and it is also understood that such changes and modifications belong to the technical scope of the present invention. Components in the embodiment described above may be combined freely within a range not departing from the spirit of the invention.

At least following matters are described in the present specification. Corresponding constituent elements or the like in the above-described embodiment are shown in parentheses. However, the present invention is not limited thereto.

For example, the DC-DC converter 10 using the three-phase magnetic coupling reactor 1 is shown in the above embodiment, but the present invention can also be applied to a DC-DC converter using a multi-phase magnetic coupling reactor of three or more phases, but a core of the multi-phase magnetic coupling reactor of three or more phases needs to be integrated.

In addition, in the present invention, the core having the planar structure in which the first outer core portion 21, the inner core portion 22, and the second outer core portion 23 are on the same plane is shown, but the present invention is not limited to this and may be a core having a three-dimensional structure in which the first outer core portion 21, the inner core portion 22, and the second outer core portion 23 are disposed in a circumferential direction at intervals of 120°.

At least following matters are described in the present specification. Corresponding constituent elements or the like in the above-described embodiment are shown in parentheses. However, the present invention is not limited thereto.

(1) A control device (control device CTR) for a power conversion device (DC-DC converter 10) using a multiphase magnetic coupling reactor (three-phase magnetic coupling reactor 1), in which
the three-phase magnetic coupling reactor including:
a first outer coil (first outer coil 11);
a second outer coil (second outer coil 13);
an inner coil (inner coil 12) disposed between the first outer coil and the second outer coil; and
a core (core 20) including a first outer core portion (first outer core portion 21) around which the first outer coil is wound, a second outer core portion (second outer core portion 23) around which the second outer coil is wound, and an inner core portion (inner core portion 22) around which the inner coil is wound, in which
the first outer core portion, the second outer core portion, and the inner core portion extend in a first direction (X-axis direction) and are disposed side by side in a second direction (Y-axis direction) orthogonal to the first direction,
the first outer core portion, the second outer core portion, and the inner core portion are connected by a first connecting portion (first connecting portion 24) that extends in a second direction (Y-axis direction) on one end side in the first direction, the first outer core portion, the second outer core portion, and the inner core portion are connected by a second connecting portion (second connecting portion 25) that extends in the second direction on the other end side in the first direction, and directions of magnetic fluxes generated in the first outer coil, the second outer coil, and the inner coil are opposite to each other in any combination, in which the control device is configured to switch among a one-phase operation of causing currents to flow through any one of the first outer coil, the second outer coil, and the inner coil to be operated, a two-phase operation of causing the currents to flow through any two of the first outer coil, the second outer coil, and the inner coil to be operated, and a three-phase operation of causing the currents to flow through all of the first outer coil, the second outer coil, and the inner coil to be operated, and select two phases of the first outer coil and the second outer coil in the two-phase operation, and select one of the first outer coil and the second outer coil in the one-phase operation before the two-phase operation or a one-phase operation after the two-phase operation.

According to (1), in the two-phase operation, since the two phases of the first outer coil and the second outer coil are selected, an amount of the magnetic fluxes passing through the first outer core portion and the second outer core portion becomes uniform. In addition, at the time of switching from the one-phase operation to the two-phase operation and switching from the two-phase operation to the one-phase operation, the operating phase operates as it is, and the phase in which the operation state is changed is minimum, and thus the fluctuation of the current is reduced. Accordingly, the controllability is stabilized, and the area that can be operated with a small number of phases is increased, so that efficiency of the power conversion device is improved.

(2) In the control device for a power conversion device according to (1), the first outer coil, the second outer coil, and the inner coil are respectively connected to switch portions (switch portions SW1, SW3, and SW2), the control device performs PWM control (pulse width modulation control) over the switch portions, the switch portion connected to one of the first outer coil and the second outer coil maintains a duty ratio at the time of switching from the one-phase operation to the two-phase operation, and the switch portion connected to the other of the first outer coil and the second outer coil gradually increases a duty ratio at the time of switching from the one-phase operation to the two-phase operation.

According to (2), the fluctuation of the current at the time of switching from the one-phase operation to the two-phase operation is further reduced, and the switching can be smoothly performed.

(3) In the control device for a power conversion device according to (1) or (2), the first outer coil, the second outer coil, and the inner coil are respectively connected to the switch portions (switch portions SW1, SW3, and SW2), the control device performs the PWM control (pulse width modulation control) over the switch portions, the switch portion connected to one of the first outer coil and the second outer coil maintains a duty ratio at the time of switching from the two-phase operation to the one-phase operation, and the switch portion connected to the other of the first outer coil and the second outer coil gradually reduces a duty ratio at the time of switching from the two-phase operation to the one-phase operation.

According to (3), the fluctuation of the current at the time of switching from the two-phase operation to the one-phase operation is further reduced, and the switching can be smoothly performed.

The invention claimed is:

1. A control device for a power conversion device using a multi-phase magnetic coupling reactor, the multi-phase magnetic coupling reactor including:

a first outer coil;

a second outer coil;

an inner coil disposed between the first outer coil and the second outer coil; and a core including a first outer core portion around which the first outer coil is wound, a second outer core portion around which the second outer coil is wound, and an inner core portion around which the inner coil is wound, wherein:

the first outer core portion, the second outer core portion, and the inner core portion extends in a first direction and are disposed side by side in a second direction orthogonal to the first direction;

the first outer core portion, the second outer core portion, and the inner core portion are connected by a first connecting portion that extends in a second direction on one end side in the first direction;

the first outer core portion, the second outer core portion, and the inner core portion are connected by a second connecting portion that extends in the second direction on the other end side in the first direction; and directions of magnetic fluxes generated in the first outer coil, the second outer coil, and the inner coil are opposite to each other in any combination;

the control device is configured to switch among:

a one-phase operation of causing currents to flow through any one of the first outer coil, the second outer coil, and the inner coil to be operated;

a two-phase operation of causing the currents to flow through any two of the first outer coil, the second outer coil, and the inner coil to be operated; and a three-phase operation of causing the currents to flow through all of the first outer coil, the second outer coil, and the inner coil to be operated;

the control device is configured to select two phases of the first outer coil and the second outer coil in the two-phase operation; and the control device is configured to select one of the first outer coil and the second outer coil in the one-phase operation before the two-phase operation or a one-phase operation after the two-phase operation.

2. The control device for a power conversion device according to claim 1, wherein:

the first outer coil, the second outer coil, and the inner coil are respectively connected to switch portions;

the control device performs PWM control over the switch portions;

the switch portion connected to one of the first outer coil and the second outer coil maintains a duty ratio at the time of switching from the one-phase operation to the two-phase operation; and the switch portion connected to the other of the first outer coil and the second outer coil gradually increases a duty ratio at the time of switching from the one-phase operation to the two-phase operation.

3. The control device for a power conversion device according to claim 1, wherein:
- the first outer coil, the second outer coil, and the inner coil are respectively connected to the switch portions;
- the control device performs the PWM control over the switch portions;
- the switch portion connected to one of the first outer coil and the second outer coil maintains a duty ratio at the time of switching from the two-phase operation to the one-phase operation; and
- the switch portion connected to the other of the first outer coil and the second outer coil gradually reduces a duty ratio at the time of switching from the two-phase operation to the one-phase operation.

* * * * *